United States Patent [19]

Bartfield

[11] 4,438,683

[45] Mar. 27, 1984

[54] APPARATUS FOR DISPENSING INDIVIDUAL ORDERS OF A HOT FOOD PRODUCT AND COMPONENTS USABLE THEREWITH

[75] Inventor: William Bartfield, Sherman Oaks, Calif.

[73] Assignee: Prize Frize, Inc., Sherman Oaks, Calif.

[21] Appl. No.: 352,579

[22] Filed: Feb. 26, 1982

[51] Int. Cl.³ .......................................... A47J 37/12
[52] U.S. Cl. ...................................... 99/330; 99/335;
 99/353; 99/355; 99/356; 99/357; 99/407;
 99/443 C; 99/483; 99/536; 194/10; 221/150 A;
 222/372; 426/509
[58] Field of Search ............... 99/352, 353, 356, 407,
 99/483, 355, 330, 516, 536, 443 C, 335, 357;
 221/9, 15, 21, 30, 92, 93, 96, 97, 150 R, 150 A;
 426/429, 430, 431, 509, 441; 222/51, 64, 67, 80,
 129.1, 129.2, 129.3, 129.4, 146 R, 146 H, 372;
 194/2, 9 R, 10

[56] References Cited

U.S. PATENT DOCUMENTS

| | | |
|---|---|---|
| 2,026,003 | 12/1935 | Sharp . |
| 2,869,475 | 1/1959 | Bobo . |
| 3,021,224 | 2/1962 | Stagmeier . |
| 3,039,883 | 6/1962 | Skokie . |
| 3,063,849 | 11/1962 | Nelson et al. . |
| 3,085,020 | 4/1963 | Backinger et al. . |
| 3,260,607 | 7/1966 | Asselbergs et al. . |
| 3,280,723 | 10/1966 | Hughes et al. . |
| 3,282,704 | 11/1966 | Fritzberg . |
| 3,297,450 | 1/1967 | Loska, Jr. . |
| 3,338,724 | 8/1967 | Adler et al. . |
| 3,347,425 | 10/1967 | Beushausen et al. . |
| 3,396,036 | 8/1968 | Liepa . |
| 3,407,080 | 10/1968 | Rainwater et al. . |
| 3,448,677 | 6/1969 | Dexters . |
| 3,457,088 | 7/1969 | Beck . |
| 3,458,325 | 7/1969 | Beck . |
| 3,459,141 | 8/1969 | Keil . |
| 3,468,354 | 9/1969 | Reachert. |
| 3,468,673 | 9/1969 | Keller . |
| 3,605,647 | 9/1971 | Beck et al. . |
| 3,622,355 | 11/1971 | Beck . |
| 3,634,105 | 1/1972 | Beck . |
| 3,645,196 | 2/1972 | Johnston et al. . |
| 3,685,432 | 8/1972 | Hoeberigs. |
| 3,690,247 | 9/1972 | Van Cleven et al. . |
| 3,703,246 | 11/1972 | Horak............................ 222/80 XR |
| 3,764,345 | 10/1973 | Beck et al. . |
| 3,771,937 | 11/1973 | Harmon et al. . |
| 3,782,969 | 1/1974 | Beck et al. . |
| 3,789,750 | 2/1974 | Beck et al. . |
| 3,809,758 | 5/1974 | Mathias et al. . |
| 3,818,820 | 6/1974 | Harris et al. . |
| 3,885,056 | 5/1975 | Smith................................ 426/441 |
| 3,890,453 | 6/1975 | Harmon et al. . |
| 3,896,715 | 7/1975 | Mascret . |
| 3,908,111 | 9/1975 | Du Bois et al. . |
| 3,968,265 | 7/1976 | Shatila et al. . |
| 3,975,549 | 8/1976 | Shatila et al. . |
| 3,987,210 | 10/1976 | Cremer . |
| 3,988,484 | 10/1976 | Shatila . |
| 3,997,684 | 12/1976 | Willard.............................. 426/441 |
| 4,005,139 | 1/1977 | Kortschot et al. . |
| 4,007,292 | 2/1977 | Shatila et al. . |
| 4,044,163 | 8/1977 | Shatila et al. . |
| 4,056,345 | 11/1977 | Shatila et al. . |
| 4,060,367 | 11/1977 | Shatila et al. . |
| 4,082,855 | 4/1978 | Citti et al. . |
| 4,096,791 | 6/1978 | Weiss.................................. 99/353 |
| 4,109,012 | 8/1978 | Bates et al. . |
| 4,198,437 | 4/1980 | Citti et al. . |
| 4,221,842 | 9/1980 | Toft . |
| 4,238,517 | 12/1980 | Bosley et al. . |
| 4,252,252 | 2/1981 | Gross......................... 222/1294 XR |
| 4,272,556 | 6/1981 | Shatila et al. . |
| 4,293,582 | 10/1981 | Hamann et al. . |
| 4,359,935 | 11/1982 | Murray......................... 99/356 XR |

FOREIGN PATENT DOCUMENTS

1308782 3/1973 United Kingdom .

Primary Examiner—Billy J. Wilhite
Attorney, Agent, or Firm—Fleit, Jacobson, Cohn & Price

[57] ABSTRACT

An apparatus and method for dispensing individual orders of a hot food product. The apparatus is designed to use a food product provided in a dehydrated form, such food product being readily reconstituted by the addition of a liquid. The apparatus includes a mechanism for delivering an amount of dehydrated food product corresponding to the size of an individual order, a chamber and system for rehydrating the product, a mechanism for cutting rehydrated product forced out of the chamber, a cooking device for the severed product, and a conveyor for deliverying cooked product. The invention further provides a lever that combines a closure for a carrier of dehydrated product with a shower head for furnishing water for reconstituting the product, and provides a device for cooking and for conveying rehydrated product.

17 Claims, 17 Drawing Figures

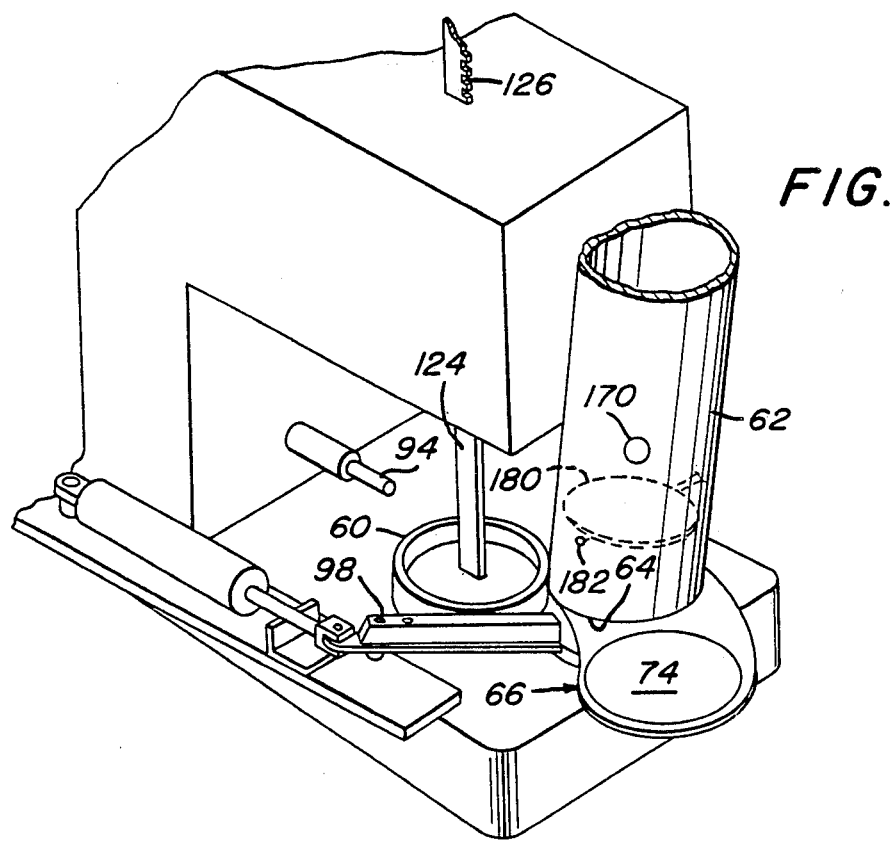
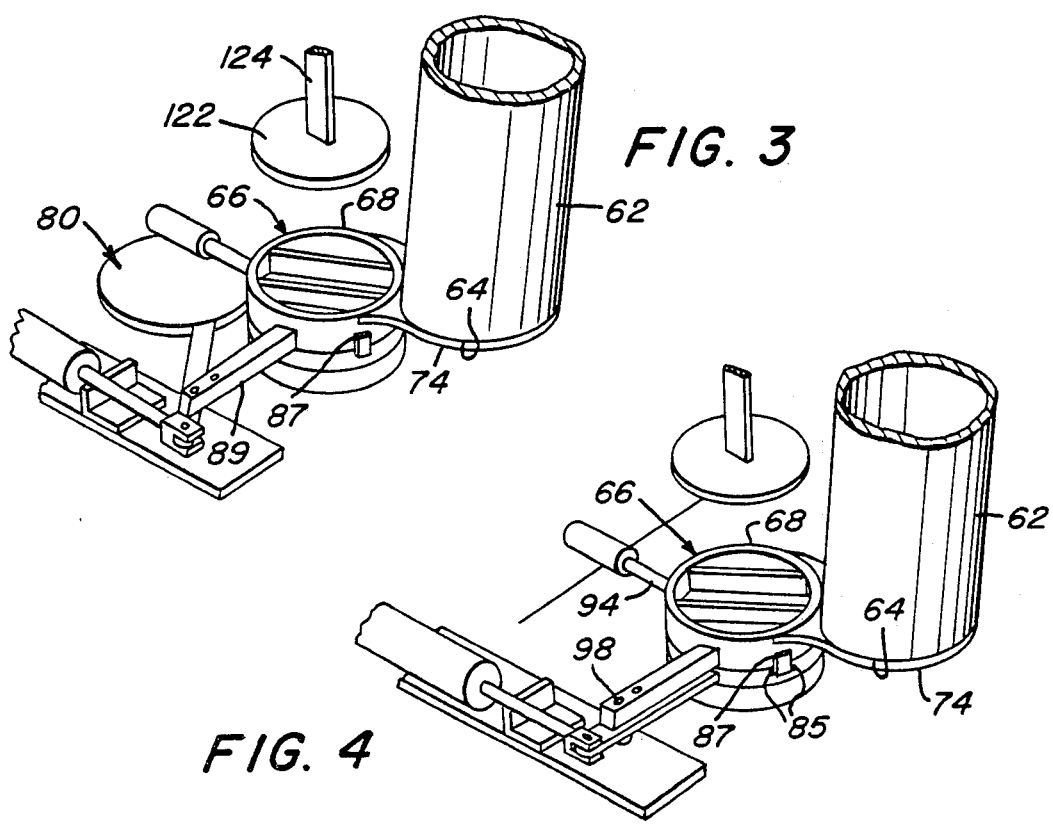

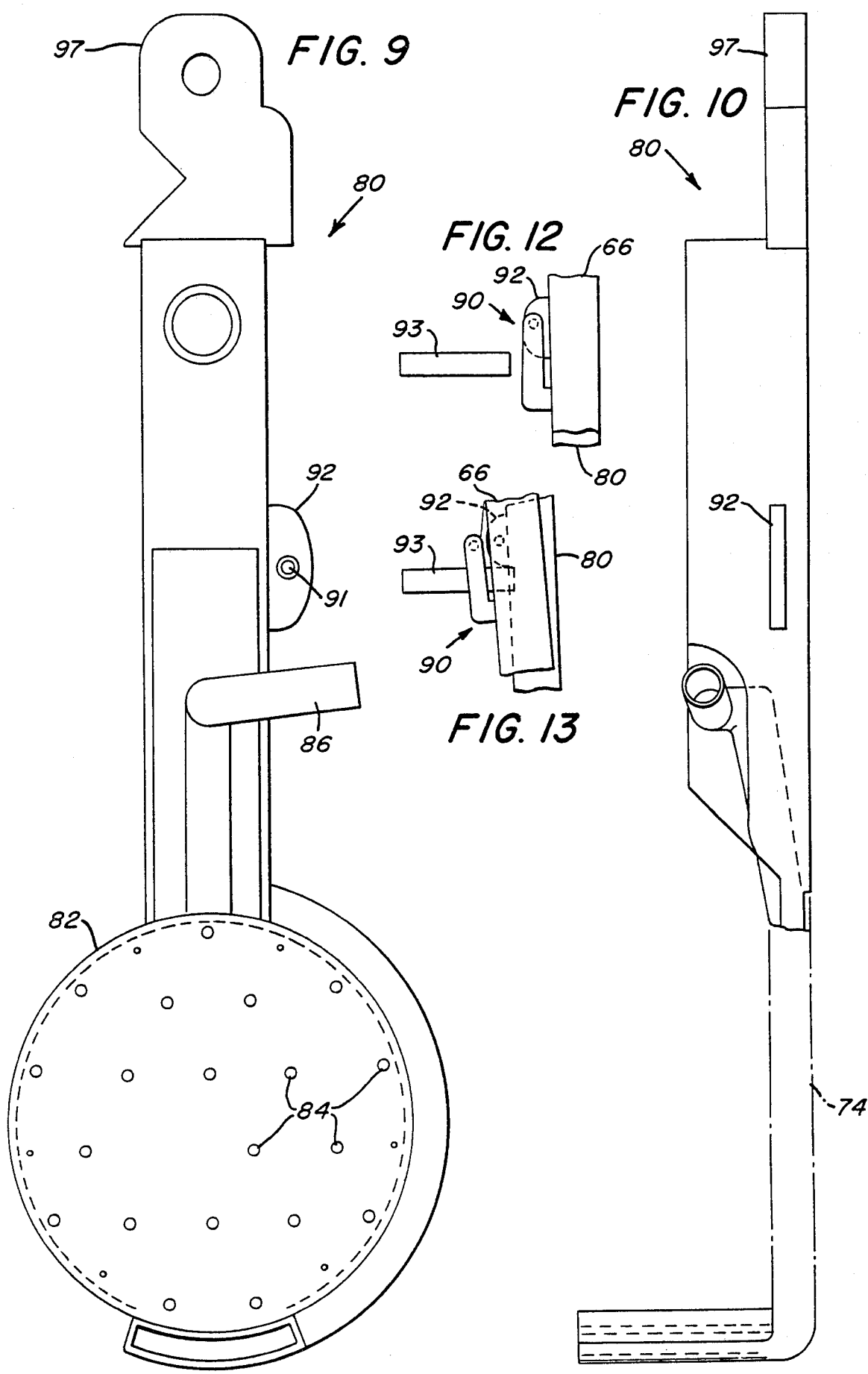

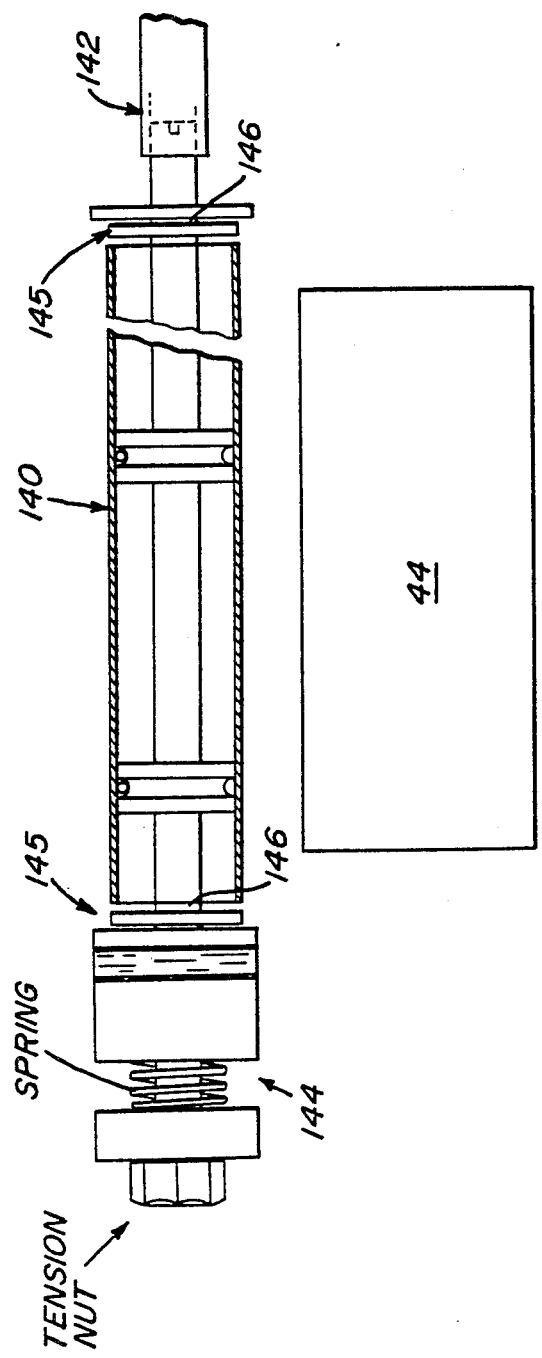

APPARATUS FOR DISPENSING INDIVIDUAL ORDERS OF A HOT FOOD PRODUCT AND COMPONENTS USABLE THEREWITH

BACKGROUND OF THE INVENTION

1. Field of the Invention

The present invention relates to an apparatus and components of an apparatus for dispensing individual orders of a hot food product. More particularly, the invention relates to the provision of individual orders of a food product resembling french fries. The invention provides an apparatus and machine for reconstituting agglomerates of potato particles into homogenous dough, for dividing or separating the potato dough into pieces having the shape of french-fry-cut potato pieces, and for heating and browning the thus-formed pieces.

2. Description of the Prior Art

U.S. Pat. No. 3,622,355 describes a dry product and a process for making the product that can be reconstituted without mixing or agitation to form a uniform dough. French-fry-cut potato pieces can be formed from such dough by employing apparatus of the type described in U.S. Pat. No. 3,605,647, U.S. Pat. No. 3,764,345, U.S. Pat. No. 3,771,937, U.S. Pat. No. 3,782,969, U.S. Pat. No. 3,789,750, and U.S. Pat. No. 3,890,453.

Also known in the prior art are automatic machines for selling or dispensing fried foods. For instance, such machines are described in U.S. Pat. No. 3,488,677, U.S. Pat. No. 3,690,247, and U.S. Pat. No. 3,818,820. A problem with machines of the type described in these patents is the relatively rapid deterioration of the raw materials used to make the dispensed product and the relatively limited raw materials storage capacity of the machines. Another problem with such machines is the relatively long period of time, in excess of two minutes, required to cook a fresh or frozen product. The product must be heated slow enough to thoroughly cook the center of the product, without overcooking the exterior. Such requirement places a limit on the temperature of the oil used to cook the product.

SUMMARY OF THE INVENTION

Accordingly, it is an object of the present invention to provide an apparatus for dispensing individual orders of a hot food product, the food product being stored in a dehydrated form within the apparatus.

Another object of the present invention is to provide a device that both seals a carrier for dehydrated food product and supplies water to the food product after it has been delivered to a rehydrating cylinder.

Still another object of the present invention is to provide a combined heating and conveying apparatus for heating and browning food product and for delivering the food product to an outlet of a dispensing machine.

Yet another object is to provide a mechanically simple system for maintaining the level of heating or cooking liquid within a vessel or tank at a desired level or within a desired range.

The apparatus provided by the present invention includes storage means for storing a supply of food product to be dispensed in a dehydrated form. A supply device is provided for transferring a predetermined amount of dehydrated food product corresponding to the size of an individual order from an outlet of the storage means to a rehydrating chamber. Liquid is dispensed on the dehydrated product in the chamber to thereby reconstitute the food product. A piston forces the reconstituted product through a die positioned adjacent or within the outlet of the rehydrating chamber. A cutting device is provided adjacent the outlet of the die to sever individual pieces forced through the die by the piston. The individual severed pieces fall into a heated container of heating or cooking oil disposed beneath the rehydrating chamber. A conveyor is positioned above the cooking oil container for movement between a first position in which an end portion of the container is disposed beneath the level of cooking oil in the container and second position in which the end portion is spaced above the level of cooking oil. When the conveyor is in the first position, it is driven in a direction to carry severed food product into the cooking oil. When the conveyor is in the second position, it is driven in a direction to carry the heated or cooked food product towards the outlet of the apparatus. Preferably, a dispensing sequence is initiated by a coin-operated or card control mechanism. Alternatively, a partial dispensing sequence is initiated after a predetermined lapse of time following the preceding dispensing operation.

In one embodiment, the storaqe means is a storage hopper sized to hold several hundred individual orders of agglomerate material. The hopper has a downwardly extending discharge duct. A movable vane is disposed in a lower portion of the duct for taking the weight of the material in the duct and hopper off of the supply device. The position of the vane is adjustable to compensate for variations in the weight of the agglomerate material resulting from variations in ambient conditions, such as humidity. The vane is movable into a position blocking discharge of material when the supply device is removed for cleaning.

It is preferable for the various components of the machine to be releasably interconnected to the frame of the machine to facilitate cleaning. For instance, the supply device and the device used to supply water are movable about a pivot pin inserted in a recess or slot. The pin is simply lifted upward out of the slot to allow removal of the water and agglomerate material supply devices.

Since the present invention is designed to dispense individual orders, control of the ratio of agglomerate material to water is more critical than in the prior art devices which are designed to mix several orders at a time. Control of the amount of agglomerate material is provided by appropriate sizing of the device used to transport material from the agglomerate hopper to the reconstituting chamber. Control of the amount of liquid is provided by a hydraulic system using a piston-cylinder device. Movement of the piston in one direction withdraws a precise amount of pre-heated water or other suitable liquid from a reservoir. Movement of the piston in the opposite direction delivers the water to a water distribution device positioned above the reconstituting chamber. The cylinder is heated so as to ensure that the water is delivered at the required temperature to the water distribution device.

The water distribution device is similar to a shower head and has a plurality of openings connected to a plenum that receives water from the cylinder. The plenum is sized to ensure even distribution of the water, and the water is delivered to the plenum at a rate that is fast enough to prevent trickling of water through only some of the openings and slow enough to prevent formation of a hydrostatic head. As a result, the water is delivered to and evenly distributed over the agglomerate material.

The agglomerate material used in the apparatus of the present invention is a pre-cooked product so that there is no need to cook the center of an individual piece. As a result, a relatively high temperature is used to quickly heat and brown the exterior of the individual pieces of food product. Individual orders can be heated and dispensed in sixty seconds or less. As one order is being heated, the reconstituting process for the next order is in progress so that heating of orders can occur on an almost continuous basis. This capability is extremely important when the apparatus is used in a cafeteria.

The invention, and its objects and advantages, will become more apparent from the detailed description of the preferred embodiment hereinafter presented.

BRIEF DESCRIPTION OF THE DRAWINGS

In the detailed description of the preferred embodiment of the invention hereinafter presented, reference is made to the accompanying drawings, in which:

FIG. 2 is a schematic representation of a portion of the apparatus of FIG. 1 prior to the initiation of a reconstitution cycle for an individual order;

FIG. 3 is a schematic partial view of the location of components of FIG. 2 after the initiation of the reconstitution cycle;

FIG. 4 is a view similar to FIG. 3 of the location of components during a subsequent portion of the reconstitution cycle;

FIG. 9 is a bottom plan view of one embodiment of a device for adding liquid to a dehydrated product;

FIG. 10 is a side view of the device of FIG. 9;

FIG. 12 is a top view schematically illustrating interengagement between two of the components during a portion of the reconstituting cycle;

FIG. 13 is a view similar to FIG. 12 illustrating separation of the components during another portion of the reconstituting cycle;

FIG. 16 is a schematic view of a portion of a conveying apparatus used in the heating and conveying portion of the apparatus of FIG. 1.

DESCRIPTION OF THE PREFERRED EMBODIMENT

Figure 1:
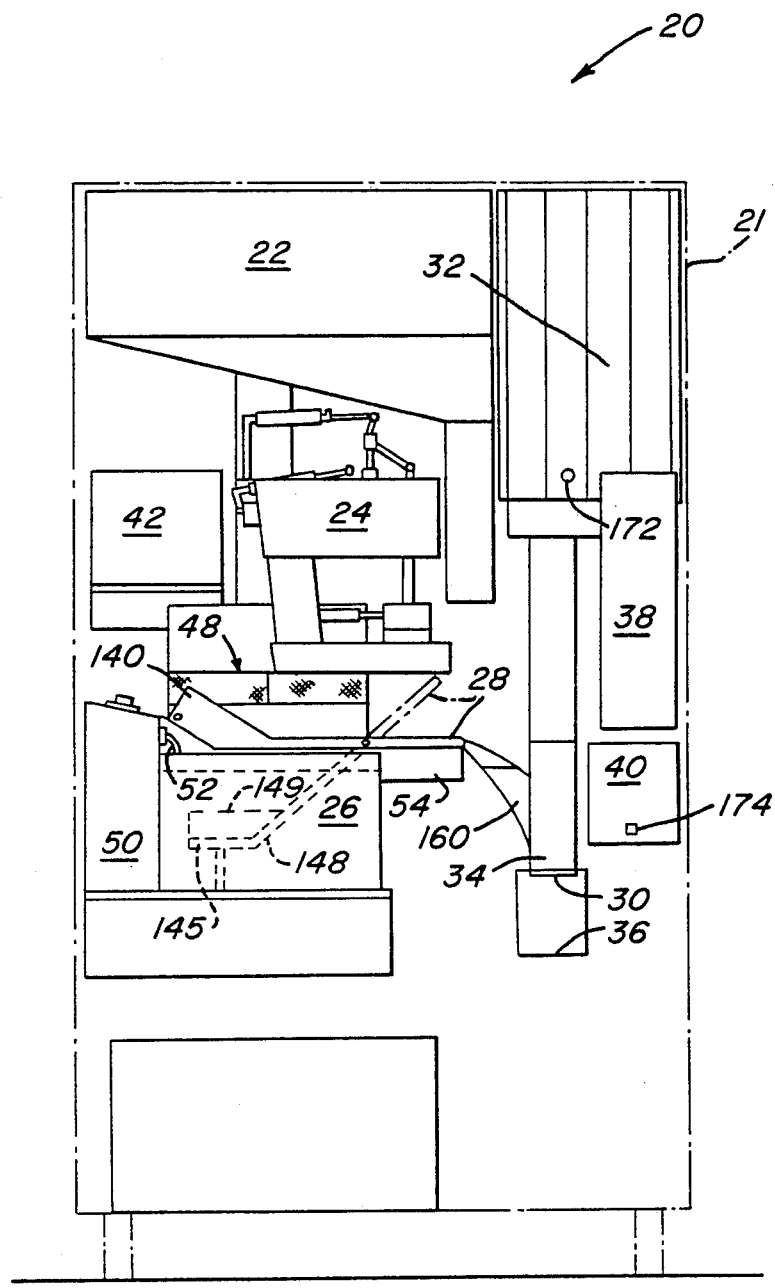
FIG. 1 is a schematic representation of one embodiment of an apparatus for dispensing individual orders of a hot food product according to the present invention.

The following description will be directed in particular to elements forming part of, or cooperating more directly with, the present invention. Elements not specifically shown or described herein are understood to be selectable from those known in the art.

Referring now to the drawings, and to FIG. 1 in particular, one embodiment of the present invention is illustrated and will be described in connection with an apparatus for dispensing individual orders, generally designated 20. The apparatus 20, in a preferred embodiment, is used to dispense individual orders of potato pieces that resemble french fried potatoes. Accordingly, the following description will be directed to the use of the apparatus to provide a food product resembling french fried potatoes. It, however, should be readily appreciated that the apparatus provided by the present invention can be used to dispense individual orders of other types of food products. Also, the components combined in the apparatus provided by the present invention can be incorporated in other systems used to mix or dispense food product.

The apparatus 20 has a housing or casing 21 that encloses the various components of the apparatus. Means for storing a supply of food product to be dispensed in a dehydrated form, such as a raw product hopper 22, is disposed in an upper portion of the housing 21. Means for rehydrating or mixing the food product, generally designated 24, are located in a central portion of the housing 21. Means for heating or cooking individual orders, generally designated 26, are located in a lower portion of the casing 21. Means for conveying heated or cooked product, generally designated 28, extend between the means for heating 26 and an outlet 30 of the apparatus. A dispenser 32 for cups or containers has an outlet chute 34 aligned with the outlet 30 for feeding containers to a platform 36. Preferably, a dispensing operation is initiated by insertion of one or more coins into a coin-operated mechanism, generally designated 38. It should be readily appreciated that the dispensing operation can also be initiated manually and under control of card operation.

A dispenser for accessories, generally designated 40, is actuatable by the mechanism 38. Preferably, the accessories include a supply of salt, a supply of catsup, and at least one napkin or similar product.

The hopper 22 is sized to contain a large amount of dehydrated product to be dispensed. For instance, a suitable product is an agglomerated dehydrated potato product of the type described in U.S. Pat. No. 3,622,355. Such product is an agglomerate of dehydrated potato particles that is reconstitutable without agitation to form a substantially homogenous dough even when disposed as a consolidated mass. Proper reconstitution requires controlled adding of a precise amount of water heated to a predetermined temperature. Variations in the amount, temperature, and rate of addition of water adversely effect the composition of the reconstituted product. The potato dough, when properly reconstituted, exhibits uniform cohesive characteristics that allow for ready division into shapes suitable for french frying. The hopper 22, alternatively, contains other suitable product to be dispensed.

The means for heating individual orders 26 includes a reservoir 42 for a suitable cooking liquid, such as oil. The reservoir 42 supplies the cooking liquid to a tank or other suitable container 44. Preferably, an electrically operated float level or other suitable sensing device is provided in the tank 44 to provide for automatic control of the level 46 of liquid within the tank. A preferred system for maintaining the level 46 at a desired point or within a desired range will be described in more detail subsequently. An air filtration system, generally designated 48, is provided above the tank 44. The system 48 includes a metal shroud fitting over the top of the tank 44 to prevent escape of fumes from the heated liquid, an electrical fan for removing the fumes, and a mesh screen or other suitable filter for removing contaminates from the fumes before they are exhausted to the atmosphere. Preferably, an oil filtration system is provided for removing cooking liquid from the tank, for filtering the liquid to remove contaminates, and for returning the filtered liquid to the tank. Preferably, the filtration system includes a mesh screen that is readily removable to facilitate cleaning. An electrical heater 50 has a heating element 52 positioned within the tank 44 to maintain the liquid at a desired temperature. Since the reconstituted product already has been cooked, the temperature can be maintained at a relatively high temperature to rapidly brown the exterior of individual food pieces. There is no need to cook the interior of the product. A container 54 for accumulating liquid drained from the heated product is provided underneath an end portion of the conveying means 28 that protrudes beyond the side edge of the tank 44.

Figure 5:
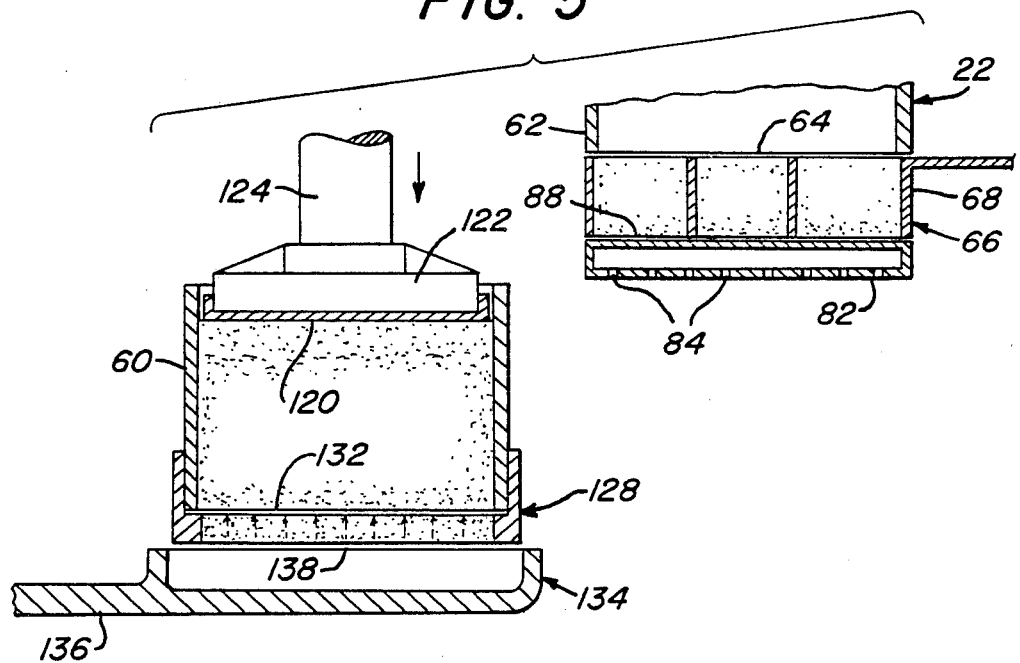
FIG. 5 is a schematic sectional view of the location of components at the initiation of a dispensing cycle for an individual order.
Figure 6:
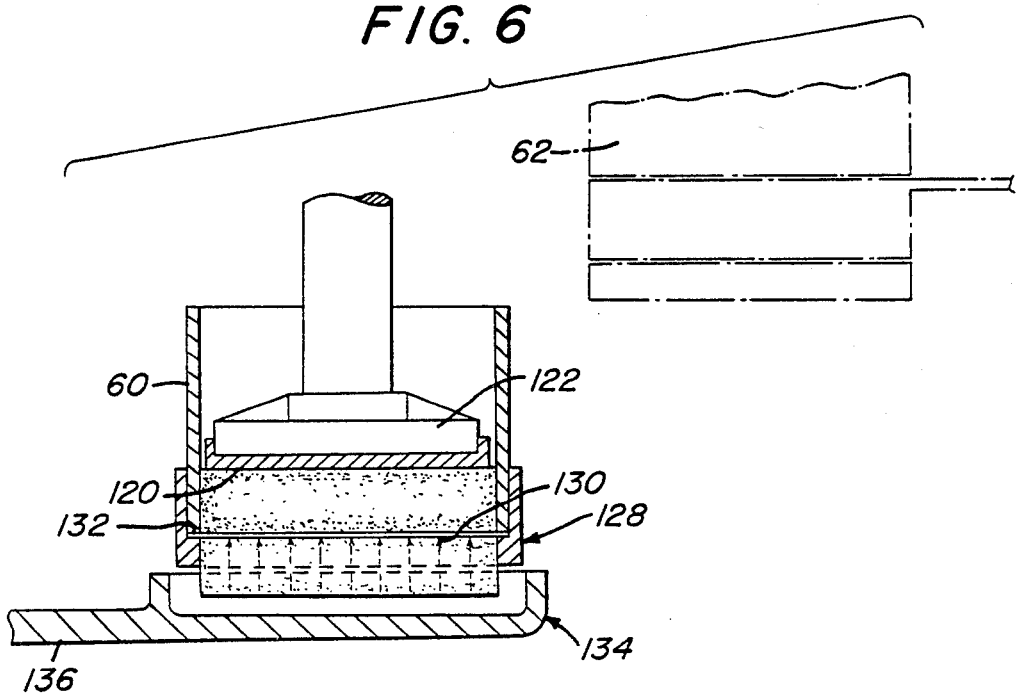
FIG. 6 is a view similar to FIG. 5 of the location of components during a subsequent portion of the dispensing cycle.
Figure 7:
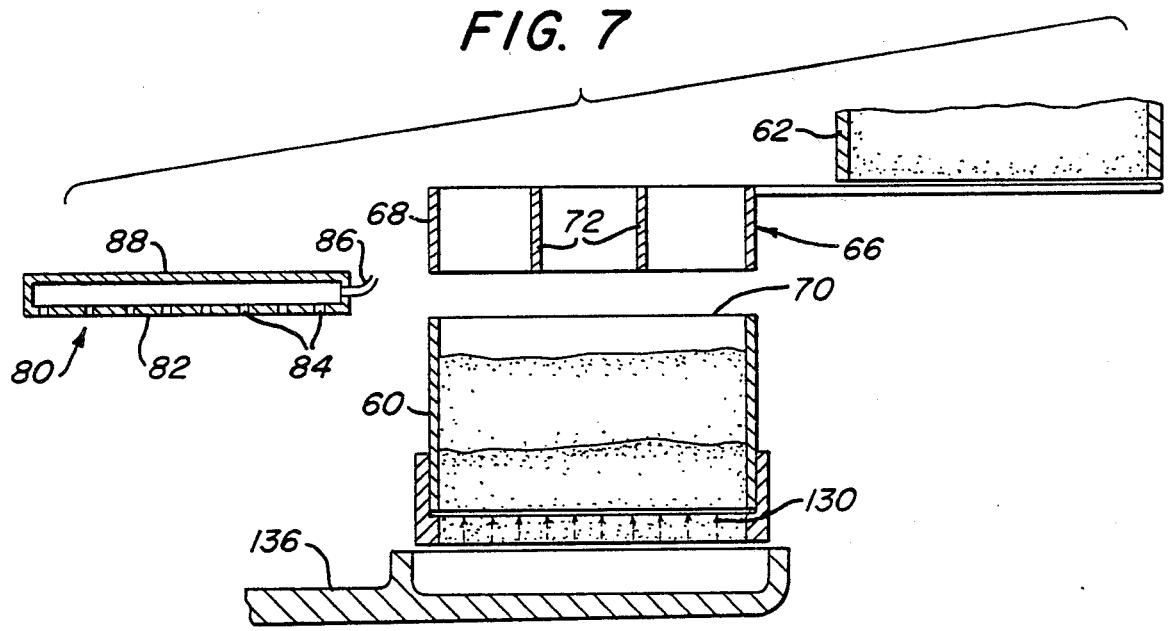
FIG. 7 is a view similar to FIG. 5 of the location of components during a portion of the reconstituting cycle.

Referring now to FIGS. 2 to 8, components of the systems of the apparatus 20 used to transfer dehydrated product from the hopper 22 to a rehydrating cylinder or chamber 60 are shown. As illustrated in FIGS. 2 and 5, the hopper 22 has a lower wall 62 defining an outlet 64 of the hopper. An agglomerate carrier, generally designated 66, has a carrying portion 68 with open upper and lower ends. As illustrated in FIG. 5, the carrying portion 68 is positionable in a first position in which the upper end of the carrying portion is aligned with the wall 62 defining the outlet 64 of the hopper 22. Further, as illustrated in FIG. 7, the carrying portion 68 is positionable in a second position in which the lower end of the carrying portion 68 is aligned with an inlet opening 70 of the rehydrating or mixing chamber 60. Preferably, the interior of the carrying portion 68 is divided by walls 72 into a plurality of chambers so as to provide for more even dispersion or spread of the agglomerate both within the carrying portion and within the chamber 60. It has been found that two walls making three compartments provide good results.

Figure 8:
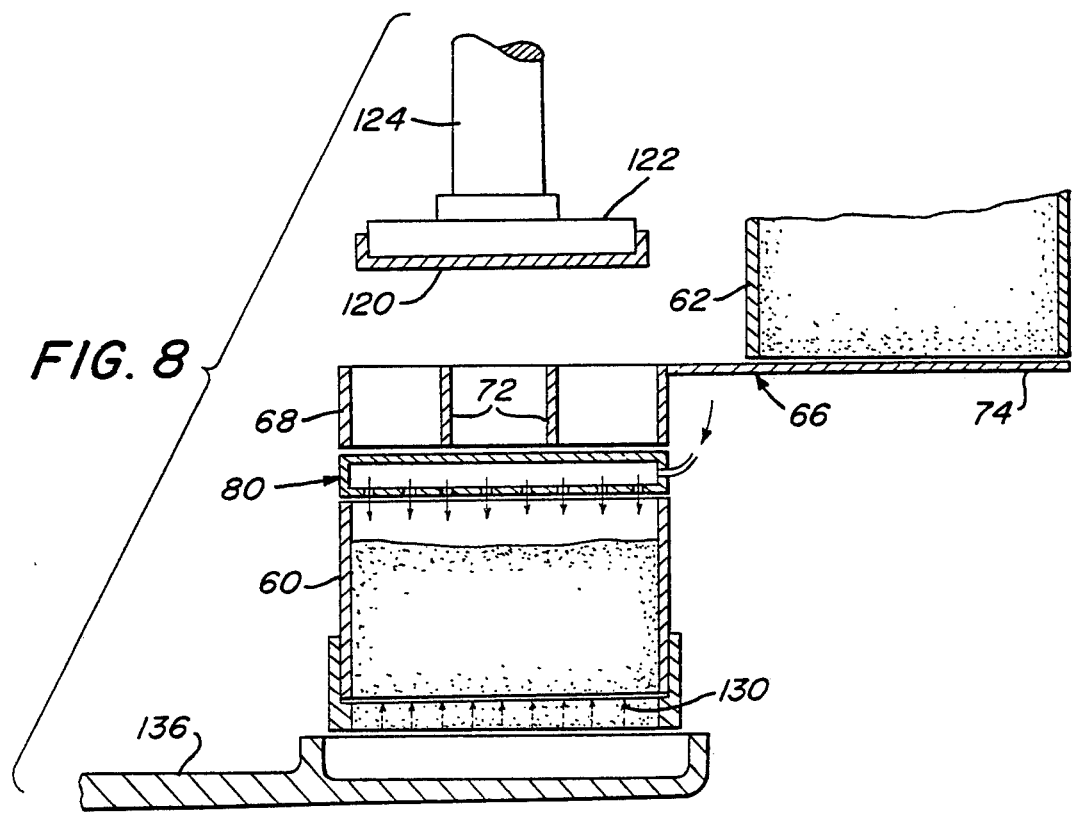
FIG. 8 is a view similar to FIG. 7 of the location of components during a subsequent portion of the reconstituting cycle.

As illustrated in FIGS. 3, 4, and 8, the agglomerate carrier 66 has portion thereof 74 that closes the outlet 64 of the hopper 22 when the carrying portion 68 is in its second position. Appropriate guides (not illustrated) are preferably provided for guiding movement of the carrier 66 between its two extreme positions and for holding the carrier 66 in an aligned position with the outlet 64 or chamber 60.

A lever arm, generally designated 80, is schematically illustrated in FIGS. 2 to 4 and illustrated in plan in FIGS. 9 and 10. The lever arm 80 has one end portion thereof forming a shower head 82 that has a plurality of openings 84 for providing uniform dispersion of liquid, such as heated water, over dehydrated agglomerated material or other material in the mixing or rehydrating chamber 60. A plenum is provided above the openings to ensure dispersion of the liquid uniformly over all of the openings. The lever arm 80 is provided with suitable passageways or tubing 86 for connecting the plenum to a source or reservoir of the liquid to be dispensed. An upper surface of the shower head 82 forms a plate member 88 that, as best illustrated in FIG. 5, closes the lower end of the carrying portion 68 when the agglomerate carrier 66 is in its first position.

Suitable means, such as a spring-operated latch generally designated 90 in FIGS. 12 and 13, is provided for positively interconnecting the agglomerate carrier 66 and the lever arm 80 during movement of the carrying portion 68 from its first to its second positions. An end portion of the latch 90 is received in an aperture 91 of a plate 92 forming part of lever arm 80. A ramp-shaped member 93 is carried by the frame of the apparatus and is positioned to separate the latch 90 from the aperture 91 as the carrier 66 and arm 80 approach the second position. When the interconnected carrier 66 and lever arm 80 reach the second position, suitable means, such as a snubber 94 (illustrated in FIGS. 2 and 4) contacts the carrier 66 to prevent its continued movement with the lever arm 80. Other means, such as a solenoid-operated latch, are usable to provide releasable interconnection between lever arm 80 and carrier 66. The lever arm 80 is then movable independent of the carrier 66 to position the shower head 82 in a third position that is spaced from the inlet of the rehydrating chamber 60. As the shower head 82 moves towards its third position, the agglomerated material in the carrying portion 68 falls evenly into the inlet of the chamber 60 on top of reconstituted, rehydrated, or mixed material already in the chamber 60. Conjoint movement of the loaded carrier 66 and lever arm 80 is ensured by the provision of spaced apart guides 85 on the arm 80 and a member 87 protruding downwardly from the carrier 66. Also suitable springs are usable to bias the carrier 66 into its second position.

The shower head 82 is then returned to the second position thereof. Water is then fed to the shower head for dispersion on the material within the chamber 60.

Movement of the lever arm 80 is controlled by a drive member or rod 95 of a piston cylinder unit 96 connected to a second end 97 of the lever arm 80. During a first portion of the stroke of the rod 95, the lever arm 80 and the carrier 66 are conjointly moved from the first position in which the carrier is aligned with the outlet of the hopper and filled with material, to the second position in which the carrier is aligned with the inlet of the chamber 60. During a second portion of the movement of the rod, the shower head 82 is moved away from the bottom of the carrier so that the material in the carrier falls into and is evenly dispersed within the chamber 60. During a third portion of the movement of the rod, the shower head 82 is returned to a position in alignment with the inlet of the chamber 60. During a final portion of the movement of the rod, the carrier 66 and lever arm 80 are returned to their first positions.

Figure 15:
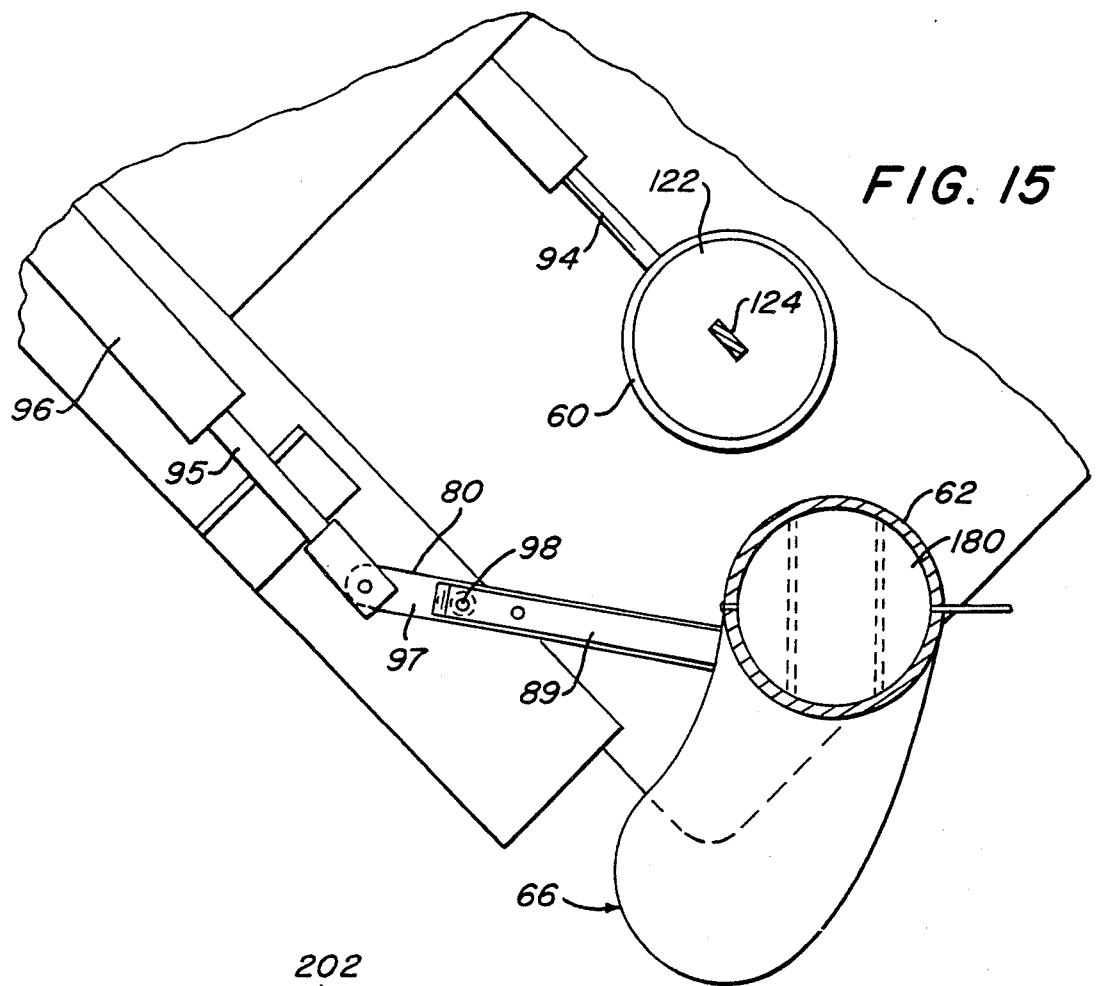
FIG. 15 is a schematic top view of a system used to control movement of system components during a reconstituting cycle.

As best illustrated in FIG. 15, both a lever arm 89 of the carrier 66 and an intermediate portion of lever arm 80 are movable about a common pivot pin 98. The pin 98 is a drop fit in an aperture provided in a portion of the machine frame so as to facilitate removal of the carrier 66 and lever arm 80 for cleaing. The other interconnections between system components also are designed to facilitate easy assembly and disassembly for cleaning, for instance, bayonet-type connections are used between driving and driven components.

Figure 11:
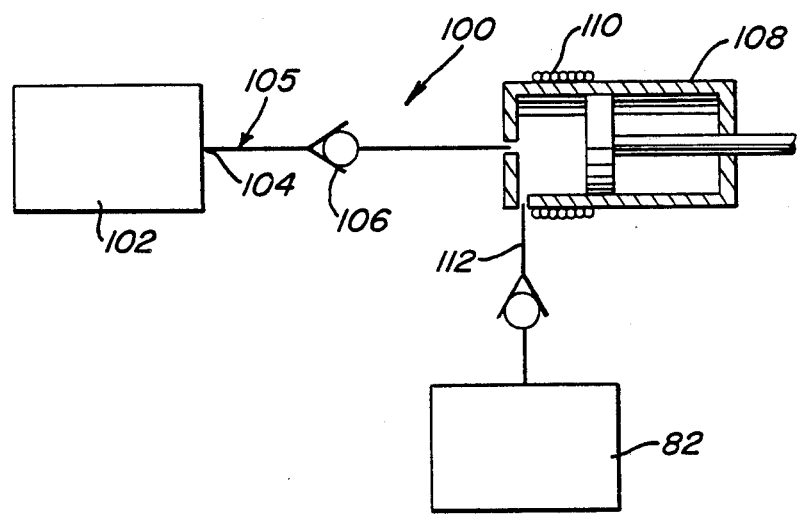
FIG. 11 is a schematic representation of one embodiment of a system for supplying liquid to the device of FIG. 9.

Referring now to FIG. 11, a suitable water supply system, generally designated 100, for supplying water to the shower head 82 is illustrated. The system 100 includes a reservoir 102, which is preferably heated, and which is connectable to a source of water. An outlet 104 of the reservoir 102 is connected by tubing 105, via a one-way valve 106, to an inlet of a piston cylinder device 108. Movement of a piston of the device in a first direction creates suction within the cylinder that draws a predetermined volume of water into the cylinder. Preferably, heating coils 110 surround the cylinder to maintain the liquid at a desired temperature or within a desired range of approximately 3° F. When the shower head 82 is located in its second position, the piston of the device 108 is actuated to feed the liquid through tubing 112 to the inlet of tubing 86. Provision of the heated piston cylinder device 108 to furnish water to the shower head 82 ensures that the required quantity of water at the right temperature is furnished to the shower head for discharge on the material within the chamber 60.

Since only one order is reconstituted at a time, it is extremely important to provide precise control of the amount of liquid or water furnished the rehydrating chamber. It has been found that an impeller pump provides undesirable fluctuations in the amount of liquid supplied because of variation in the position of the vane of the pump when a dispensing operation is initiated. With the piston-cylinder device used in the present invention, such variation is eliminated and control of variations as small as one gram is possible.

Another factor influencing proper reconstitution of the agglomerated material is control of the temperature of the added water. Heat loss is difficult to prevent from the tubing used to transport the water from the reservoir to the shower head. The affects of such heat loss are minimized by heating the cylinder of the device 108.

Still another factor influencing proper reconstitution of presently available product is the rate and manner in which water is added. Water should be applied uniformly over the surface of the product and should be influenced only by the force of gravity. Provision of the plenum in the shower head evenly distributes the supplied water as a thin film over all the openings and eliminates kinetic energy accumulated by the water during its passage from the reservoir. Movement of the piston of the piston-cylinder unit 108 is controlled so that water is furnished to the plenum at substantially the same rate as water leaving the plenum so that no hydrostatic head is developed.

After the water has been discharged onto the material, a waiting or curing period, for instance approximately 10 to 15 seconds, is provided to allow absorption of the water by the agglomerate. The reconstituted material in the lower portion of chamber 60 forms a barrier to prevent escape of the water from the chamber. After the expiration of the curing period, the material, when properly reconstituted, forms a potato agglomerate mixture that is a formable dough. As the mixture is being cured, the carrier 66 and arm 80 are returned to the first positions thereof in alignment with the outlet of the hopper 22. As the carrier 66 moves into its first position, it is automatically filled with material to be reconstituted. When the carrier is in its first position and filled with material, it is ready for initiation of the next reconstitution cycle.

After curing, the reconstituted material is ready to be forced out of the chamber 60 by the end face 120 of a piston 122 during the next dispensing cycle of operation. The duration of the preceding dispensing cycle is sufficiently long to allow curing of the mixed product. Movement of the piston into and out of the chamber 60 is controlled by a rod 124. Preferably, an upper portion of the rod is formed with ratchets 126 that are engaged by a suitable gear (not illustrated). Rotation of the gear is controlled by a motor that is intermittently started and stopped to advance the rod 124 and piston 122 by discrete, predetermined distances into the chamber 60.

Alternatively, a rod of a piston-cylinder unit is connected to an upper end of rod 124 to control movement of the piston 122 into and out of the chamber 60. As with the illustrated embodiment, the rod 124 has a portion carrying marking indicia, such as a serrated portion. When a dispensing cycle is initiated, the piston-cylinder unit is energized to advance rod 124 into the rehydrating chamber 60. A sensing device senses movement of the indicia on rod 124 to deenergize the piston-cylinder unit and energize a cutting mechanism. After completion of a cutting cycle, the piston-cylinder unit is again energized and the process repeated.

Advancement of the piston into the chamber 60 forces the agglomerated material through a die head, generally designated 128, that has a plurality of wires or plates 130 positioned within or adjacent to the lower outlet end 132 of the chamber 60. The individual plates 130 are spaced from each other by a distance corresponding to the desired width of each piece formed from the material forced out of the chamber 60 by the piston 122. The distance between side walls supporting the plates determines the lengths of the individual pieces. After the dough or agglomerated material is moved by the piston a predetermined distance corresponding to the desired thickness of the piece, the motor driving the rod 124 is stopped, and a cutting or severing mechanism, generally designated 134, is actuated. The cutting mechanism includes a carrier or support 136 that has upwardly extending arms supporting a cutting knife or wire 138. The wire 138 is closely spaced from the lower end of the die head 128 so as to sever material forced out of the cylinder 60 from material remaining within the cylinder. Preferably, the individual pieces severed by the wire 138 resemble potato pieces suitable for french frying. Movement of the piston 122 into the cylinder 60 is synchronized with movement of the cutting mechanism 134 so that only one of the two is energized at a given time.

One embodiment of the invention provides eleven individual cut pieces each time the knife 138 is moved across the outlet of the die 128. It is presently contemplated that an individual order would contain thirty-three individual cut pieces. Thus, the piston 122 is incrementally advanced three times and the knife 138 is advanced three times to provide a total of thirty-three individual cut pieces. It should be readily apparent that the number of incremental advancements and the number of cutting strokes are a function of the desired size of the order.

Preferably, the end face 120 is connected to the piston 122 so that the end face is movable with respect to the piston. When the rod 124 withdraws the piston from the chamber 60, the end face pivots with respect to the piston to prevent creation of a vacuum within the chamber that might tend to remove the agglomerated product from the upper or inlet end of the chamber.

Referring now to FIGS. 1 and 16, components of the means for heating individual orders 26 and the means for conveying 28 are illustrated. As previously mentioned, the heating means 26 includes a tank 44 filled with cooking liquid up to a level 46. The conveying means 28 includes a belt or revolving wire conveyor 140 that has a plurality of openings formed therein to allow drainage of heating or cooking liquid from a heated product. The belt is rotated by a drive 142 connected by a pin-and-slot or bayonet-type connection to an output shaft of a motor. The direction of rotation of the shaft is reversible to drive the belt 140 in either a first direction in which the belt carries severed product into the tank 44, or in a second direction in which the belt carries heated product towards the outlet 30 of the apparatus. When the belt is driven in the first direction, a clutch 144 is engaged to rotate a frame 145 suporting the conveyor 140 about a pivot 146 so that an end portion 148 of the belt is moved from a first position above the level of liquid in the tank to a second position in which the end portion extends below the level of liquid. The clutch includes a spring that ensures slippage after the lower portion of the frame or a bracket attached to the frame contacts the bottom of the tank. Rotation of the belt in the opposite direction results in return of the submerged end portion 148 to a position spaced above the level of liquid within the tank.

The end portion 148, as illustrated, extends at an angle to the main portion of the belt 140. The portion of the frame 145 supporting end portion 148 also supports side walls and an end wall of a basket 149. The belt 140 forms another end wall of the basket, and the end portion 148 forms the bottom of the basket. Portions of the basket side walls extend below the belt 140 so as to contact the bottom of tank 44 to thereby define the second position of the belt.

It is preferable for the conveyor belt to be oriented in its second position with the end portion 148 below the level of the liquid prior to severing of the first individual pieces. Also, it is desirable to provide a damping mechanism to limit the rate of movement of the conveyor into the tank to prevent splashing of the liquid in the tank. The severed individual pieces fall either directly into the tank or on to conveyor 140 and then into the tank and strike the liquid which ensures separation of the individual pieces from each other. The conveyor belt 140 carries the pieces into the basket 149, and ensures separation of the pieces severed during a preceding operation from those severed during a succeeding operation. After the desired number of individual pieces has been severed and heated, the drive of the belt is reversed so as to deliver the individual heated pieces toward the outlet of the apparatus. Although the first severed pieces are heated longer than the last severed pieces, for instance four or five seconds, the differential in heating time does not adversely affect the quality of the finished product.

Figure 14:
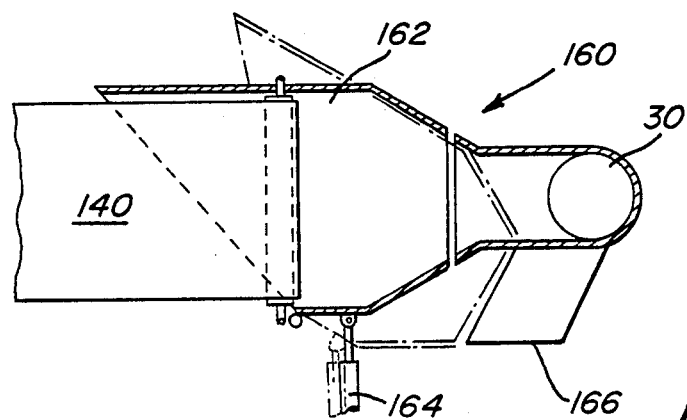
FIG. 14 is a schematic top view of an outlet portion of the apparatus of FIG. 1.

A chute 160 interconnects the end of the conveyor 140 with the outlet 30. As best illustrated in FIG. 14, a portion 162 of the chute is movable by a solenoid-operated plunger 164 between a first position in which heated product is directed to the outlet 30 and a second position, illustrated in phantom, in which heated product is directed to a waste receptacle 166.

Another feature of the present invention is the provision of a damper 180 in the outlet chute of the hopper 22. The damper 180 is movable by a control member 182 located outside of the chute. The damper 180 is provided to minimize the effect of the weight of material in the hopper 22 on the feeding of the material. The angle of the damper is adjustable to vary the size of the space used to feed material. When the ambient humidity is relatively low, the material is lighter and tends to flow freely. As humidity increases, the material becomes heavier and flows less freely. Adjustment of the damper 180 provides a means for compensating for such variations in the flow rates of material. The damper 180 also is movable into a position blocking flow of material out of the hopper 22. The damper is located in this position when the lever arm 80 is removed for a cleaning operation.

Figure 17:
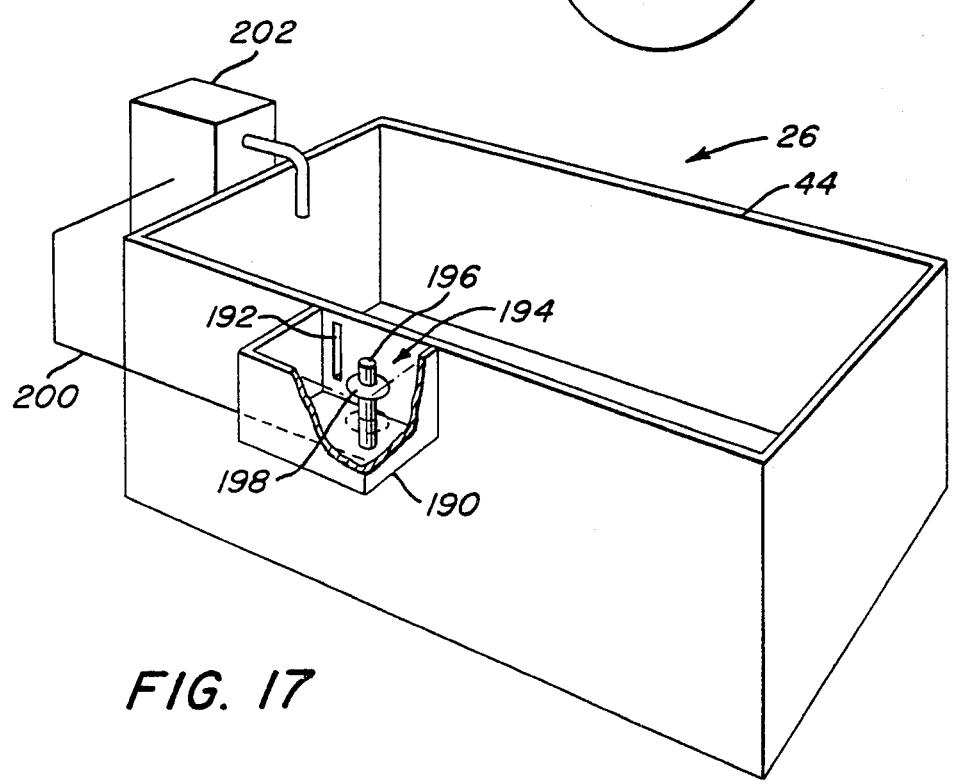
FIG. 17 is a schematic representation of a system used to maintain the level of heating or cooking liquid within desired levels.

Referring now to FIG. 17, a system or means for automatically replenishing or adding liquid to the tank 44 is illustrated. The system includes a container 190 that is supported by an exterior wall of the tank 44. The container 190 is connected to the interior of an upper portion of tank 44 by a slot 192. As a result, the level of liquid within the container 190 will be the same as that in tank 44, after the liquid level in the tank rises above the bottom of the slot. A conventional electronic liquid level sensing device, generally designated 194, is disposed within the container 190. The device 194 has a shaft 196 supported by the container and a sensing element 198 slidably guided on the shaft that floats or is partially submerged in the liquid. The interaction between the shaft and sensing device is such that an electrical signal is generated that is representative of the position of the sensing device. Such signal is fed, via a line 200, to a device 202 for adding liquid to the tank.

When the sensing device falls below a predetermined level, such as the position illustrated in phantom in FIG. 17, a signal is generated to energize a pump or open a valve of the device 202 to add liquid to tank 44. When the sensing device is above a predetermined level, such as the solid line position in FIG. 17, the device 202 is deenergized.

In a typical sequence of operations, it is assumed that two fully mixed patties, each being the size of a desired individual order, are already fully mixed within the chamber 60. If the chamber 60 is not loaded, it will be necessary to first insert a preformed pattie or blank within the lower end portion of the chamber 60 to provide a barrier for material and liquid introduced into the chamber 60.

The sequence of operations is initiated by insertion of a card, control signal, or one or more coins into the coin-operated mechanism 38. The mechanism 38 generates an appropriate control signal to start an order dispensing cycle, followed by a pattie making or reconstituting cycle. The dispensing cycle which includes heating or cooking, takes approximately sixty seconds, while the pattie making cycle takes approximately thirty seconds. The pattie making cycle occurs simultaneously with a portion of the heating cycle so that overall machine cycle time is kept to a minimum.

Initially, the conveyor drive mechanism is energized to position the basket 149 below the level of liquid in the heating tank. Next, the piston 122 is advanced by a predetermined amount into the chamber 60 to force material through die head 128. Movement of the piston is stopped and the cutting mechanism 134 is actuated to commence a severing operation. This procedure is repeated the desired number of times, for instance three times, to obtain a requisite number of individual cut pieces. After a sufficient amount of dough has been forced through the die head, the piston 122 is removed from the upper or inlet end of the chamber 60.

While the severed product is being heated, the reconstituting cycle is started by actuating the piston cylinder unit 92 to transfer the agglomerate carrier 66 and shower head 82 from the first or fill position to the second or discharge position. As the carrier 66 is moving from the first toward the second position, the sealing portion 74 of the carrier progressively closes the outlet of the hopper 22. Movement of the carrier 66 is stopped in the second position, while movement of the shower head 82 continues to progressively clear the plate member 88 from the outlet of the carrier body 68. As the outlet is cleared, the contents of the carrier are discharged into the mixing cylinder 60. After all of the contents have been discharged, the shower head 82 is returned to the second position. Water is then supplied to the shower head and falls under the force of gravity onto the agglomerate within the cylinder. If necessary, an air blast is used to purge all water from the shower head and to assist in the mixing of the agglomerate and water. The agglomerate carrier and base or shower head 82 are then returned to the first or fill position so that the carrier can be refilled with material from the hopper. The piston 122 is then moved into the chamber 60 to seal the chamber and protect its contents. The material within the chamber 60 becomes reconstituted prior to the end of the order dispensing cycle. As a result, the next order dispensing cycle can be initiated as soon as the previous cycle is terminated. Return of the piston into the cylinder ends the pattie-making portion of the sequence of operations and readies the system for the next dispensing operation.

The frying or heating portion of the order dispensing cycle commences with energization of the drive 142 to move the belt conveyor in the first direction for conveying severed products into the tank. Movement of the belt in the first direction engages the clutch 144 so that the end portion 148 is pivoted into the hot cooking liquid or oil within the tank 44. The belt is located in such position prior to severing the first part of the order. Severed products are carried by the belt into the cooking oil for a period of approximately fifty seconds, depending on the characteristics of the product and the temperature of liquid in tank 44. The wire frame basket 149 is positioned around the end portion 148 to accumulate the first portion of the order. The drive 142 is then reversed so that the belt conveyor runs in a direction conveying heated or cooked products towards the outlet of the apparatus. Movement of the belt conveyor in this direction results in withdrawing of the end portion 148 from the tank and conveying of the heated products to the upper or inlet end of the chute 160. The chute 160 delivers the heated products to a cup positioned on the platform 36. Dispensing of the cup onto the platform is in response to a signal generated by the coin-operated mechanism 38. Preferably, the mechanism 38 also generates a signal that results in a container of accessories being dispensed by the dispenser 40.

A conventional sensor 170 is provided for sensing when the hopper 22 is empty of material. Another conventional sensor 172 senses when the dispenser 32 is out of cups. A third sensor 174 senses when the accessory dispenser 40 is empty. An "empty" signal is generated by the sensor either when the sensed container is empty or when a blockage prevents proper feeding. The control system of the apparatus prevents actuation of the apparatus upon generation of an "empty" signal by any of the sensors.

While the dehydrated product presently used in the apparatus is relatively stable when dry, the rehydrated or reconstituted product tends to decompose with the passage of time. One of the features provided by the present invention is the provision of a mechanism for sensing the lapse of time between two orders. When the lapse of time between a preceding and a succeeding order exceeds a predetermined period of time, for instance, two hours, the control system generates a signal initiating a dispensing operation. The control signal generates the same sequence of operations as that generated by the insertion of a coin or coins into the coin-operated mechanism, except that cup and accessory dispensing signals are not generated. In addition, the solenoid controlling the plunger 164 is actuated to move the chute 162 into alignment with the waste receptacle 166 for a period of time sufficient to divert the product produced during the cycle.

From the preceding, it should be noted that the present invention, automatically and without manual intervention, provides a product similar to a freshly fried french fried potato from a mixture of a dried powder and water, while at the same time creating a minimum amount of waste of unused product. Advantages stemming from use of a dehydrated product include a much higher storage capacity within the apparatus, for instance, the capacity to store sufficient quantity of product to fill at least six hundred orders. Further, use of a dehydrated product avoids the problems associated with deterioration of fresh or frozen product due to atmospheric and ambient conditions. Waste is kept to a minimum by rehydrating only one portion of dehydrated potato at a time. Another advantage of the use of a reconstituted product is that the "cooking" time can be reduced significantly. Since the product is cooked during the initial dehydrating process before the product is stored in the machine, the reconstituted product need be cooked or heated only long enough to warm the interior and brown the exterior. This provides a much faster cycle time than is possible when cooking fresh or frozen products.

One embodiment of the present invention utilizes a hydraulic logic system to control the pattie making operation and an electronic system to control other functions of the apparatus. It should be readily apparent that an entirely electronic system could be used to control the various functions of the apparatus. Thus, the particular form of logic used to control the movement of the components of the apparatus has not been described in detail.

Previously, a specific embodiment of the present invention has been described. It should be appreciated, however, that such embodiment has been described for the purposes of illustration only, without any intention of limiting the scope of the present invention. Rather, it is the intention that the present invention be limited only by the appended claims.

What is claimed is:

1. An apparatus for dispensing individual orders of a hot food product comprising:
   storage means for storing a supply of food product to be dispensed and having an outlet;
   supply means for transferring an amount of food product corresponding to the size of an individual order from the storage means to mixing chamber means;

mixing chamber means having an inlet at an upper end thereof for receiving food product to be mixed and an outlet at a lower end thereof for dispensing mixed food product;

liquid dispensing means for adding a predetermined amount of liquid to said mixing chamber means to thereby provide a mixed food product;

dispensing means for forcing the mixed food product out of the outlet of said mixing chamber means;

cutting means disposed adjacent the outlet of said mixing chamber means for cutting off a portion of the food product forced out of said mixing chamber means;

heating means for receiving and for heating the cut off food product;

conveyor means including a belt conveyor for removing heated food product from the heating means and for conveying the heated food product towards an outlet of said apparatus; and control means for controlling the operation of said apparatus.

2. An apparatus for dispensing individual orders of a hot food product comprising:

storage means for storing a supply of food product to be dispensed in a dehydrated form and having wall means defining an outlet;

supply means for transferring an amount of dehydrated food product corresponding to the size of an individual order from the storage means to rehydrating chamber means;

rehydrating chamber means having wall means defining an inlet at an upper end thereof for receiving dehydrated food product and an outlet at a lower end thereof for dispensing reconstituted food product;

liquid dispensing means for adding a predetermined amount of liquid to said rehydrating chamber means to thereby reconstitute the dehydrated food product;

dispensing means for forcing the reconstituted food product out of the outlet of said rehydrating chamber means;

cutting means disposed adjacent the outlet of said rehydrating chamber means for cutting off a portion of the food product forced out of said rehydrating chamber means;

heating means for receiving and for heating the cut off food product;

conveyor means including a belt conveyor for removing heated food product from the heating means and for conveying the heated food product towards an outlet of said apparatus; and control means for controlling the operation of said apparatus.

3. An apparatus according to claim 2, further comprising container dispensing means for supplying a container for heated food product to the apparatus outlet and for locating the container in a position to receive heated food product from said conveyor means.

4. An apparatus according to claim 2, wherein said supply means comprises:

carrier means for carrying dehydrated food product from the outlet of said storage means to the inlet of said rehydrating chamber means, said carrier means having an inlet alignable with the wall means defining the outlet of said storage means and an outlet alignable with the wall means defining the inlet of said rehydrating chamber means;

plate means for closing the outlet of said carrier means, said carrier means and said plate means being movable between a first position in which the inlet of said carrier means is aligned with the outlet of said storage means and a second position in which the outlet of said carrier means is aligned with the inlet of said rehydrating chamber means;

connection means for releasably interconnecting said plate means and said carrier means for conjoint movement from said first to said second position;

release means for releasing interconnection between said carrier means and said plate means when said plate means and said carrier means arrive at said second position; and movement means for moving the interconnected plate means and carrier means from said first position to said second position, for moving said plate means independent of said carrier means to and from a third position spaced from said second position, and for moving said plate means and said carrier means to said first position.

5. An apparatus according to claim 4, wherein said liquid dispensing means comprises:

a lever arm;

a shower head formed at one end of said lever arm, said shower head having an upper surface defining said plate means;

means for pivotally mounting said lever arm so that said shower head is movable between said first, said second, and said third positions; and means for supplying the predetermined amount of liquid to said shower head when said shower head is aligned with said inlet of said rehydrating chamber means.

6. An apparatus according to claim 2, wherein said liquid dispensing means comprises:

a lever arm;

a shower head formed at one end of said lever arm;

means for pivotally mounting said lever arm so that said shower head is movable between a position aligned with the inlet of said rehydrating chamber means, and a position spaced from the inlet of said rehydrating chamber means;

reservoir means for storing heated liquid;

cylinder means for removing a predetermined amount of liquid from said reservoir means and for supplying the removed liquid to said shower head; and tubing means for interconnecting said cylinder means and said shower head.

7. An apparatus according to claim 5 wherein said cylinder means further comprises a cylinder having an inlet connectable to a reservoir of liquid and an outlet connectable to a chamber; and a piston movable within said cylinder in such manner that the piston during a portion of the movement creates a vacuum within said cylinder to draw liquid from said reservoir into said cylinder, the piston during another portion of its movement forcing the liquid from the cylinder to the chamber.

8. An apparatus according to claim 2, wherein said heating means comprises a tank for containing a heating liquid disposed vertically below the outlet of said rehydrating chamber means, and means for heating said tank.

9. An apparatus according to claim 8, and wherein said conveying means comprises:

a chain conveyor belt having a plurality of openings extending therethrough for passage of heating liquid through said belt;

drive means for driving said conveyor belt in a first direction for conveying cut off food product into said tank, and for driving said conveyor belt in a direction opposite said first direction for conveying heated food product toward the outlet of said apparatus;

mounting means for pivotally mounting said conveyor belt above said tank for movement between a first position in which said conveyor belt is spaced from liquid in said tank and a second position in which a portion of said conveyor belt is positioned below the surface of liquid in said tank; and means responsive to movement of said conveyor belt in said first direction for moving said conveyor belt into the second position thereof, and responsive to movement of said conveyor belt in said opposite direction for moving said conveyor belt into the first position thereof.

10. An apparatus according to claim 2, wherein said control means includes means responsive to insertion of a coin into said apparatus for initiating the dispensing of an individual order.

11. An apparatus according to any one of claims 2 or 10, wherein said control means includes means responsive to lapse of a predetermined period of time following the dispensing of a preceding order for initiating the dispensing of a succeeding order.

12. An apparatus according to claim 2, further comprising means positioned in the lower end of said rehydrating chamber means for separating food product being forced out of said rehydrating chamber means into a plurality of elongate bodies, said cutting means cutting portions of the bodies extending below the outlet of said rehydrating chamber means so as to separate them from food product remaining within said rehydrating chamber means, thereby forming individual cut pieces resembling potato pieces suitable for french frying.

13. An apparatus according to claim 1 or claim 2, wherein said heating means comprises a tank for holding liquid for heating the cut off food product, and means for heating said tank, said apparatus further comprising replenishment means for automatically adding liquid to said tank to maintain the level of liquid within the tank above a predetermined level, said replenishment means comprising:

a container having a smaller size than the size of said tank, said container being in fluid communication with a portion of said tank so that the level of liquid in said container is representative of the level of liquid in said portion of the tank;

a shaft extending vertically within said container;

a floatable sensing element slidably guided by said shaft so that the position of the sensing element with respect to the shaft is representative of the level of liquid in said container, said shaft and said sensing element comprising an electronic liquid level sensing means; and means for adding liquid to said tank, said means being energized by said level sensing means to add liquid to said tank when the sensed level of liquid in said tank is below a predetermined level and being de-energized when the sensed level is above a predetermined level.

14. A device for adding liquid to a food product, said device being usable with an apparatus for dispensing individual orders of heated food product, the apparatus including means for storing food product to be dispensed, means including an open ended carrier for transferring food product to be heated to a mixing chamber, means for forcing mixed food product out of the mixing chamber, means for severing food product forced out of the mixing chamber from food product remaining in the mixing chamber, and means for heating the severed food product, said device comprising a lever arm having:

a first end portion formed as a shower head for dispensing liquid into said mixing chamber;

means for connecting said shower head with a source of liquid to be dispensed;

a second end portion connectable to movement means of the apparatus so that the first end portion is movable between a first position aligned with, spaced from, and below an outlet of the means for storing, a second position aligned with and above an inlet of the mixing chamber, and a third position spaced from the second position, the open ended carrier being positioned above the first end portion so that an upper surface of the first end portion closes the lower end of the carrier when the first end portion is in the first position thereof; and a portion connectable to means for interconnecting said lever arm and said carrier for conjoint movement from the first position to the second position of the first end portion.

15. A device for adding liquid to a dehydrated food product, said device being usable with an apparatus for dispensing individual orders of cooked food product, the apparatus including means for storing dehydrated food product to be dispensed, means including an open ended carrier for transferring food product to be cooked to a rehydrating chamber, means for forcing reconstituted food product out of the rehydrating chamber, means for severing food product forced out of the chamber from food product remaining in the chamber, and means for cooking the severed food product, said device comprising a lever arm having:

a first end portion formed as a shower head for dispensing liquid into said rehydrating chamber;

means for connecting said shower head with a source of liquid to be dispensed;

a second end portion connectable to movement means of the apparatus so that the first end portion is movable between a first position aligned with, spaced from, and below an outlet of the means for storing, a second position aligned with and above an inlet of the rehydrating chamber, and a third position spaced from the second position, the open ended carrier being positioned above the first end portion so that an upper surface of the first end portion closes the lower end of the carrier when the first end portion is in the first position thereof; and a portion connectable to means for interconnecting said lever arm and said carrier for conjoint movement from the first position to the second position of the first end portion.

16. An apparatus for heating an individual order of a mixed food product, said apparatus being usable with an apparatus for dispensing individual orders of heated food product that includes means for storing food product to be dispensed, means including a mixing chamber for adding liquid to the food product, means for transferring a predetermined amount of food product from the means for storing to the mixing chamber, means for forcing mixed food product out of the mixing chamber, and means for severing food product forced out of the mixing chamber from food product remaining in the mixing chamber, said cooking apparatus comprising:

tank means for holding liquid for heating the food product, said tank means being positionable to receive food product severed by said means for severing;

means for heating said tank means;

a chain conveyor belt having a plurality of openings extending therethrough for passage of heating liquid;

means for driving said conveyor belt in a first direction for conveying severed food product into said tank means, and for driving said conveyor belt in a direction opposite said first direction for conveying heated food product to an outlet of said dispensing apparatus;

mounting means for pivotally mounting said conveyor belt above said tank means for movement between a first position in which said conveyor belt is spaced from liquid in said tank means and a second position in which a portion of said conveyor belt is positioned below the surface of liquid in said tank means; and means responsive to movement of said conveyor belt in said first direction for moving said conveyor belt into the second position thereof and responsive to movement of said conveyor belt in said opposite direction for moving said conveyor belt into the first position thereof.

17. An apparatus for cooking rehydrated food product, said apparatus being usable with an apparatus for dispensing individual orders of heated food product that includes means for storing dehydrated food product to be dispensed, means including a rehydrating chamber for rehydrating the dehydrated food product, means for transferring a predetermined amount of food product from the means for storing to the rehydrating chamber, means for forcing rehydrated food product out of the rehydrating chamber, and means for severing food product forced out of the rehydrating chamber from food product remaining in the rehydrating chamber, said cooking apparatus comprising:

tank means for holding liquid for cooking the food product, said tank means being positionable to receive food product severed by said means for severing;

means for heating said tank means;

a chain conveyor belt having a plurality of openings extending therethrough for passage of cooking liquid;

means for driving said conveyor belt in a first direction for conveying severed food product into said tank means, and for driving said conveyor belt in a direction opposite said first direction for conveying cooked food product to an outlet of said dispensing apparatus;

mounting means for pivotally mounting said conveyor belt above said tank means for movement between a first position in which said conveyor belt is spaced from liquid in said tank means and a second position in which a portion of said conveyor belt is positioned below the surface of liquid in said tank means; and means responsive to movement of said conveyor belt in said first direction for moving said conveyor belt into the second position thereof and responsive to movement of said conveyor belt in said opposite direction for moving said conveyor belt into the first position thereof.

* * * * *